United States Patent

[11] 3,615,247

| [72] | Inventors | George J. Steeves<br>Pasco;<br>William C. Crawford, Kennewick, both of Wash. |
|---|---|---|
| [21] | Appl. No. | 785,950 |
| [22] | Filed | Dec. 23, 1968 |
| [45] | Patented | Oct. 26, 1971 |
| [73] | Assignee | Phillips Petroleum Company |

[54] MODIFIED COMBUSTION ZONE IN A THERMALLY INSULATED APPARATUS
6 Claims, 1 Drawing Fig.

[52] U.S. Cl. .................................................. 23/277 C,
23/288, 263/50, 266/30, 431/158, 431/353
[51] Int. Cl. .................................................. F27d 1/12,
F27d 3/00, F23d 15/02
[50] Field of Search .......................................... 23/199,
277, 288, 288.8; 263/50; 431/158, 353; 266/29, 30

[56] References Cited
UNITED STATES PATENTS

| 2,848,305 | 8/1958 | Lehrer et al. ................. | 23/277 |
| 3,002,553 | 10/1961 | Reed ............................. | 431/353 X |
| 3,048,476 | 8/1962 | Dwyer .......................... | 23/288 X |
| 3,290,308 | 12/1966 | Marten ......................... | 23/288 UX |
| 3,332,870 | 7/1967 | Orbach et al. ................. | 23/277 X |
| 3,449,084 | 6/1969 | Smoot et al. .................. | 23/288 X |

Primary Examiner—Morris O. Wolk
Assistant Examiner—D. G. Conlin
Attorney—Young & Quigg ABSTRACT: A canopylike insert is placed intermediate the combustible gas inlet and the air inlet in a thermally insulated reactor to prevent burnout of the insulation by directing the flow of combustible gas into contact with air at a position removed from the reactor lining. A false dome may also be provided near the reactor closure means to prevent gasket burnout.

PATENTED OCT 26 1971　　3,615,247
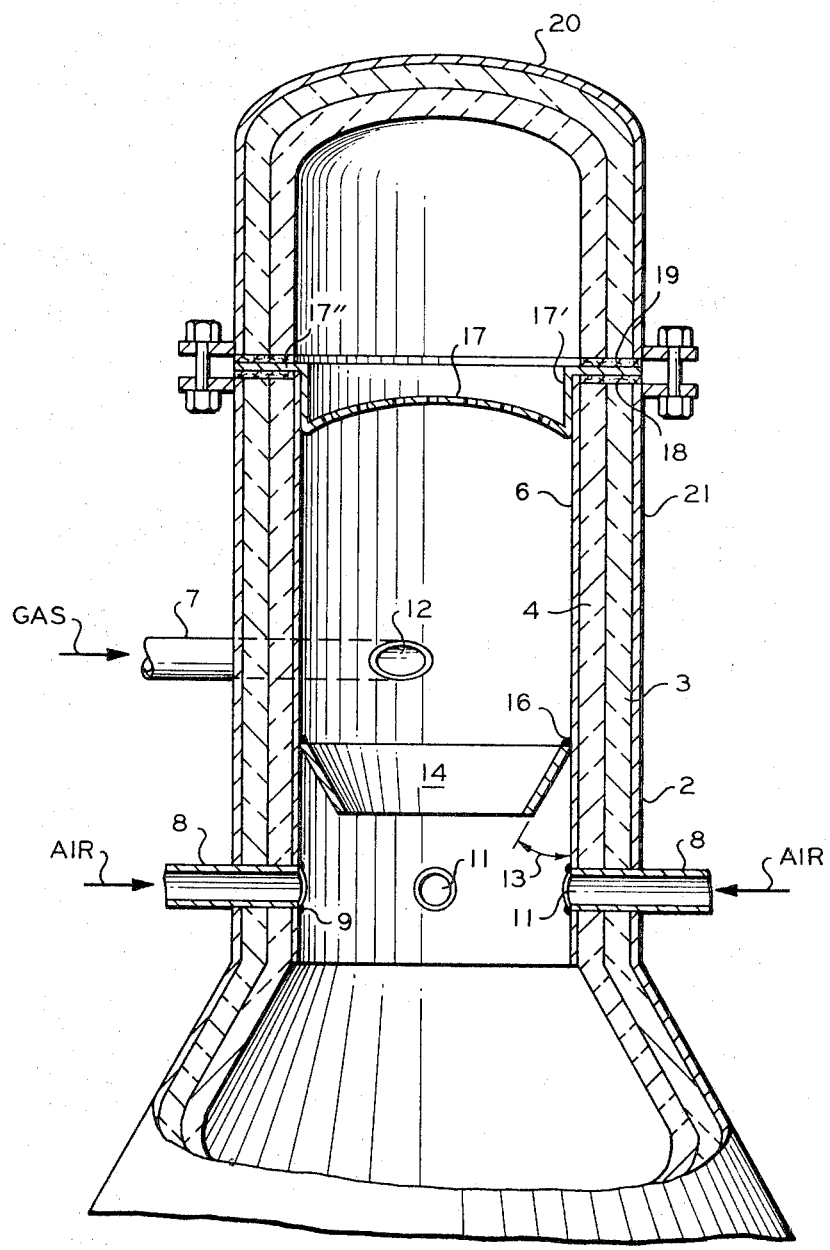
INVENTORS
G. J. STEEVES
W. C. CRAWFORD
BY Young & Quigg
ATTORNEYS

MODIFIED COMBUSTION ZONE IN A THERMALLY INSULATED APPARATUS

FIELD OF THE INVENTION

This invention relates to thermally insulated vessels. In another aspect, this invention relates to thermally insulated vessels having a combustion zone for burning of combustible materials therein. In a further aspect, it relates to apparatus for a thermally insulated reactor which is designed to protect the insulation of the reactor from burnout due to excessive heat within a combustion zone thereof.

BACKGROUND OF THE INVENTION

For many years the petrochemical industry has used thermally insulated vessels to carry out high-temperature catalytic and noncatalytic reactions. A particular problem has occurred in the art of thermal insulation where a combustible material is fed into the combustion zone of a reactor and brought into contact with air to cause combustion of the material. In this particular operation, the maintenance of the refractory linings and even the shell of the thermally insulated vessel for a useful operating period has been difficult. Not infrequently it has been found that high operating temperatures within the combustion zone cause total deterioration of the insulation linings, air inlet nozzles, and the shell of the reactor itself in a relatively short period of time. The solution to this problem by the reconstruction of the reactor results in excessively high cost to the operator in order to maintain the reactor in use.

OBJECTS OF THE INVENTION

It is an object of this invention to provide a thermally insulated reactor having a combustion zone therein which is highly resistant to burnout of the insulation linings, gaskets, air inlet nozzles, and other apparatus located in, near, or surrounding the combustion zone.

SUMMARY OF THE INVENTION

We have discovered that a thermally insulated reactor having a combustion zone which is highly resistant to decomposition of the refractory lining can be provided by inserting within the combustion zone a thermally resistant liner having a canopylike insert. The canopylike insert is located intermediate the combustible gas inlet means and the air inlet means and is of a configuration which directs the stream of combustible gas into contact with the air at a position removed from the direct vicinity of the thermally resistant liner. Accordingly, the invention successfully prevents the thermal decomposition of the air inlet nozzles caused by the combustion of the gas in the combustion zone. When the reactor is of such a design that a removable closure assembly is provided above the combustion zone, thereby allowing access to the combustion zone, the closure assembly is suitably attached to the remainder of the reactor by way of suitable connecting means. It is within the scope of the invention to prevent burnout of the gaskets which are positioned between the closure means and the remainder of the reactor by positioning in the upper portion of the combustion zone a false dome having numerous openings therein. This false dome, in combination with the canopylike device mentioned above, prevents the encroachment of high-temperature gases into the area of the gaskets between the closure member and the remainder of the reactor, thus preventing high-temperature burnout of the gaskets.

BRIEF DESCRIPTION OF THE DRAWING

The sole FIGURE of the drawing is a schematic view of the combustion zone of a thermally insulated reactor partially in cross section.

DESCRIPTION OF THE PREFERRED EMBODIMENT

The apparatus which forms out invention can best be understood by reference to the drawing wherein a thermally insulated reactor partially in cross section is illustrated in the region of the combustion zone. It is understood, however, that out invention is not necessarily limited to a reactor apparatus having the configuration as depicted in the drawing, but is intended only to illustrate the applications of the principles of our invention in a preferred situation.

This reactor is suitable for the combustion of a combustible gas in a plant system which is designed to produce ammonia. In this regard, it is suitable for use as the secondary reformer in an ammonia plant operation, such as the ammonia production system illustrated in U.S. Pat. No. 2,610,106, Worth Gray, issued Sept. 9, 1952. Accordingly, the combustion zone in the drawing is positioned above a suitable catalyst which reacts upon the gas and air mixture subsequent to combustion. The effluent from this reactor is then passed to a suitable cooling means prior to being passed to a shift converter as is depicted in the drawing of the above-mentioned patent.

As mentioned in the above patent, the temperatures which are occasioned within the combustion zone of the depicted reactor are quite high, in the range of about 1,450° to about 3,200° F. in some regions of this zone. The high temperature is the result of the combustion of a combustible gas mixture which is introduced into the combustible zone and is contacted with air. In the case of the secondary reformer, the gas which enters conduit 7 comprises hydrogen, methane, carbon monoxide, carbon dioxide, and water and steam.

The thermally insulated reactor 21 comprises an outer shell 2 having soft thermal insulation 3 and hard thermal insulation 4 lining the interior thereof. A gas inlet conduit 7 opens into reactor 21 through opening 12. A plurality of air inlet conduits 8 open into the interior of reactor 21 through openings 11.

Our invention comprises inserting within the combustion zone of reactor 21, a liner 6, a canopy 14, and, if necessary, a false dome 17. The thermally resistant liner 6 is attached by means of welds 9 to hard insulation 4 within the combustion zone of the reactor. The canopy 14 is attached to the interior of the liner 5 by weld 16 and thus is located intermediate the gas inlet opening 12 and the air inlet openings 11. The canopylike apparatus 14 is preferably of a truncated cone shape with the opening of reduced diameter being positioned downstream from the gas inlet means. However, it is understood that other shapes of canopies can be employed other than the truncated cone configuration. It is essential, however, to the function of the canopylike apparatus that the sides thereof angle inwardly from the thermally insulated liner 6, thereby defining an angle 13 between the sides of the canopy 14 and the liner 6. The degree of angle must be sufficient to position the area of direct burning within the combustion away from the liner 6. We have found that good results are obtained when the angle is about 30°.

The position of the canopy 14 relative to the gas inlet opening 12 and the air inlet openings 11 cooperates to provide for combustion of the gases away from liner 6, and inlet openings 11. Accordingly, the apparatus of the invention prevents burnout of insulation linings 3 and 4 in the vicinity of the air inlet openings 11 by preventing the encroachment of hot reactant gases along the outer surfaces of conduit 8.

Reactor 2 is provided with a closure assembly 20 which is suitably attached to shell 2 by bolted flanges as shown. False dome 17 is fastened between the flanges and inhibits the passage of hot gases into closure assembly 20.

The false dome 17 comprises a concave metallic plate having numerous openings therein, a vertical sidewall 17', and an outwardly extending flange 17''. Flange 17'' fits between the gaskets 18 and 19 which are positioned between closure member 20 and the remainder of the reactor. This arrangement provides a suitable method of positioning the false dome 17 within the upper portion of the combustion zone. The false dome thus prevents the movement of hot gases to the exterior of the reactor by burning out gaskets 18 and 19.

The materials employed in the construction of the components of the thermally insulated reactor, the reactor liner, the canopylike apparatus, and the false dome will be dependent upon the temperatures and pressures to be experienced in the operation of the reactor. When the above reactor is used as a secondary reformer in an ammonia plant system which produces ammonia from a natural gas feedstock, the temperature found within the combustion zone of the reactor will be in the range of about 1,450° to as high as about 3,200° F. in some areas, and the pressure will be in the range of 300 to 500 p.s.i.a.

Reasonable variations and modification of the above-mentioned invention will be apparent to those skilled in the art from a reading of this disclosure, the drawing and the claims. In particular, it is within the scope of our invention to provide equivalent apparatus to prevent burnout of apparatus within or near the combustion zone by providing a liner and a canopylike device intermediate the combustible gas inlet means and the air inlet means. A false dome in the upper portion of the combustion zone can be provided if necessary. This apparatus cooperates to perform the purpose of removing the zone of combustion from the vicinity of the interior insulation, and that portion of the combustion zone which is susceptible to burnout such as air inlet nozzles, gaskets, insulation linings, and the like.

We claim:

1. In a thermally insulated reactor having a combustion zone comprising a combustible gas inlet means and an air inlet means positioned downstream from the gas inlet means, the improvement comprising a thermally resistant liner surrounding the combustion zone and which extends upstream from the gas inlet means and downstream from the air inlet means, and attached to the liner intermediate the gas inlet means and the air inlet means a canopy having means defining an opening of reduced cross-sectional area downstream from the gas inlet means thus preventing burning our of the refractory lining of the reactor within the combustion zone.

2. A reactor in accordance with claim 1 wherein attached to the liner upstream from the gas inlet means there is provided a dome having means defining a plurality of openings therein which thus protects the portion of the refractory of the reactor upstream from the dome from burning out.

3. A reactor in accordance with claim 2 wherein that portion of the reactor upstream from the dome comprises a closure means which when removed from the remainder of the reactor allows access to the combustion zone, said closure means being provided with suitable flange means which by way of a connecting means allows for attachment of the closure means to the remainder of the reactor, and positioned intermediate the closure means and the remainder of the reactor in the vicinity of the refractor lining, gasket means which provide a thermally insulated seal between the closure means and the remainder of the reactor.

4. An apparatus according to claim 3 wherein the dome is concave and is positioned within the combustion zone upstream from the gas inlet means by means of flanges which are removably positioned between the gasket means thereby suspending the dome within the combustion zone when the closure means is suitably connected to the remainder of the reactor.

5. An apparatus according to claim 4 wherein the reactor and the liner are generally cylindrical in shape, and the canopy is a truncated cone in shape, and the reactor has means which are capable of supporting a catalyst bed downstream from the air inlet means.

6. An apparatus according to claim 5 wherein the gas inlet means comprises a conduit which enters the combustion zone tangentially and the air inlet means comprises at least one conduit means which allows air to enter the combustion zone at about right angles to the flow of gases through the truncated cone.